United States Patent [19]
McElroy et al.

[11] Patent Number: 5,951,659
[45] Date of Patent: Sep. 14, 1999

[54] COMMUNICATIONS-ORIENTED COMPUTER SYSTEM BACKPLANE INCLUDING A PCI INPUT/OUTPUT BUS FOR TRANSMISSION OF ADDRESS, DATA, AND CONTROL INFORMATION, AND A TIME-DOMAIN MULTIPLEXED SIGNAL BUS (TDMSB) FOR TRANSMISSION OF HIGH-SPEED DIGITIZED SIGNAL INFORMATION

[75] Inventors: Jeffrey F. McElroy, Columbia; Jimmy D. Pike, Lexingron; Robert S. Cooper, Columbia, all of S.C.

[73] Assignee: NCR Corporation, Dayton, Ohio

[21] Appl. No.: 08/834,568

[22] Filed: Apr. 7, 1997

[51] Int. Cl.[6] .............................. G06F 13/00; H04J 3/00
[52] U.S. Cl. ........................................... 710/101; 370/442
[58] Field of Search .................................. 395/281, 282, 395/308, 297, 865; 370/364, 442; 710/101, 102, 128, 117, 45; 340/855.3; 364/708.1, 709.09; 439/59, 62

[56] References Cited

U.S. PATENT DOCUMENTS

| | | | |
|---|---|---|---|
| 3,852,538 | 12/1974 | Mila | 179/91 R |
| 3,942,077 | 3/1976 | Powers | 317/118 |
| 4,481,572 | 11/1984 | Ochsner | 395/297 |
| 4,697,262 | 9/1987 | Segal et al. | 370/468 |
| 4,790,762 | 12/1988 | Harms et al. | 439/59 |
| 4,903,227 | 2/1990 | Fukushima | 395/560 |
| 4,920,480 | 4/1990 | Murakami et al. | 395/800.36 |
| 5,000,692 | 3/1991 | Taniguchi et al. | 439/160 |
| 5,036,481 | 7/1991 | Lunsford et al. | 364/708 |
| 5,051,096 | 9/1991 | Cooke et al. | 439/61 |
| 5,469,434 | 11/1995 | Kurdzo et al. | 370/364 |
| 5,544,351 | 8/1996 | Lee et al. | 395/559 |
| 5,852,725 | 12/1998 | Yen | 395/282 |

Primary Examiner—Gopal C. Ray
Attorney, Agent, or Firm—James M. Stover

[57] ABSTRACT

A communications-oriented computer system backplane including an input/output bus for transmission of address, data, and control information, the input/output bus including a plurality of expansion slot module connected to the input/output bus for the connection of I/O logic cards; and a time-domain multiplexed signal bus (TDMSB) for transmission of high-speed digitized signal information, the time-domain multiplexed signal bus including a plurality of expansion slot modules connected to the time-domain multiplexed signal bus for the connection of high-speed digitized signal logic cards. The expansion modules associated with the two busses are aligned to facilitate interconnecting the input/output bus with the time-domain multiplexed signal bus for transmitting data therebetween.

5 Claims, 3 Drawing Sheets

COMMUNICATIONS-ORIENTED COMPUTER SYSTEM BACKPLANE INCLUDING A PCI INPUT/OUTPUT BUS FOR TRANSMISSION OF ADDRESS, DATA, AND CONTROL INFORMATION, AND A TIME-DOMAIN MULTIPLEXED SIGNAL BUS (TDMSB) FOR TRANSMISSION OF HIGH-SPEED DIGITIZED SIGNAL INFORMATION

The present invention relates to computer system backplanes and, more particularly, to a computer system backplane adapted for transmission of high-speed digitized computer/telephony signal information.

BACKGROUND OF THE INVENTION

Computer systems offering network services typically include expansion connectors for the addition of hardware components to extend and enhance the function of the standard system. Additional hardware components may include modems, network cards and adapter cards permitting the connection of scanners, CD-ROM drives, tape and disk storage devices. An expansion connector, generally referred to as an input/output (I/O) bus, handles address, data, and control information required by memory and I/O controllers.

With the increase in computer/telephony server systems, there is a need for an additional connector for the transmission of time-dependent high-speed digitized signal information. The present invention relates to a communications-oriented server backplane which meets the additional transmission requirements.

A typical server backplane, such as the main logic board 12 shown in FIG. 1, provides an I/O bus or channel including multiple expansion slots. The expansion slots permit the selective connection of I/O devices through the use of logic cards including edge connectors which are received into corresponding expansion slots. Four expansion slots 14 permitting I/O connection to a PCI bus integrated into main logic board 12 are shown in FIG. 1. Additional expansion slots 16 allowing for the connection of I/O devices to a standard (E)ISA bus integrated into board 12 are also shown. The main logic board also includes one or more processors and associated chipsets, as well as many other integrated and discrete components, such as memory, disk controllers, basic input/output logic (BIOS), graphic controllers, parallel and serial communication port logic, etc.

While the server architecture described briefly above normally operates satisfactorily, it does not provide suitable connectors for the transmission of time-dependent high-speed digitized signal information to accommodate current and future computer/telephony server systems.

OBJECT OF THE INVENTION

It is therefore an object of the present invention to provide a new and useful communications-oriented server backplane for a computer network system.

SUMMARY OF THE INVENTION

There is provided, in accordance with the present invention, a communications oriented server backplane for a computer network system including a first expansion bus for transmission of address, data, and control information and a second expansion bus for transmission of time-dependent high-speed digitized signal information. The first expansion bus comprises an input/output (I/O) bus and a first plurality of aligned expansion slot modules connected with the input/output bus. The second expansion bus is a time-domain multiplexed signal bus (TDMSB) and a second plurality of aligned expansion slot modules connected with the time-domain multiplexed signal bus.

In the described embodiment, each expansion slot module connected to the I/O bus is aligned with a corresponding expansion slot module connected to the TDMSB bus, permitting interconnect of the input/output bus with the time-domain multiplexed signal bus for transmitting data therebetween.

BRIEF DESCRIPTION OF THE DRAWINGS

Other objects and advantages of the invention will become apparent from a study of the following specification when viewed in the light of the accompanying drawing, in which.

DETAILED DESCRIPTION OF THE PREFERRED EMBODIMENT

Figure 1:
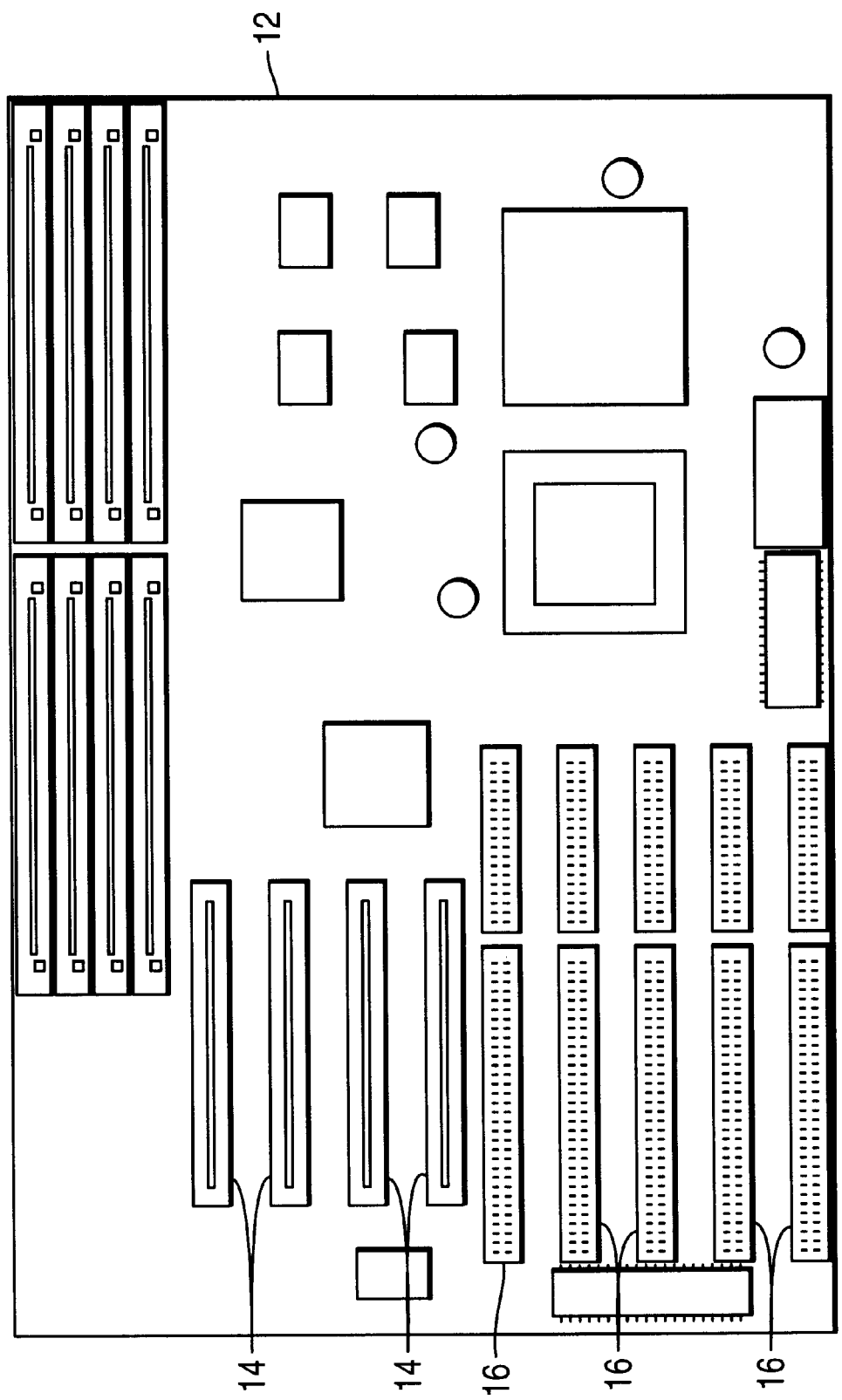
FIG. 1 is a plan view of a typical computer system backplane including (E)ISA and PCI I/O busses and expansion slot modules permitting the selective connection of I/O devices to the busses.
Figure 2:
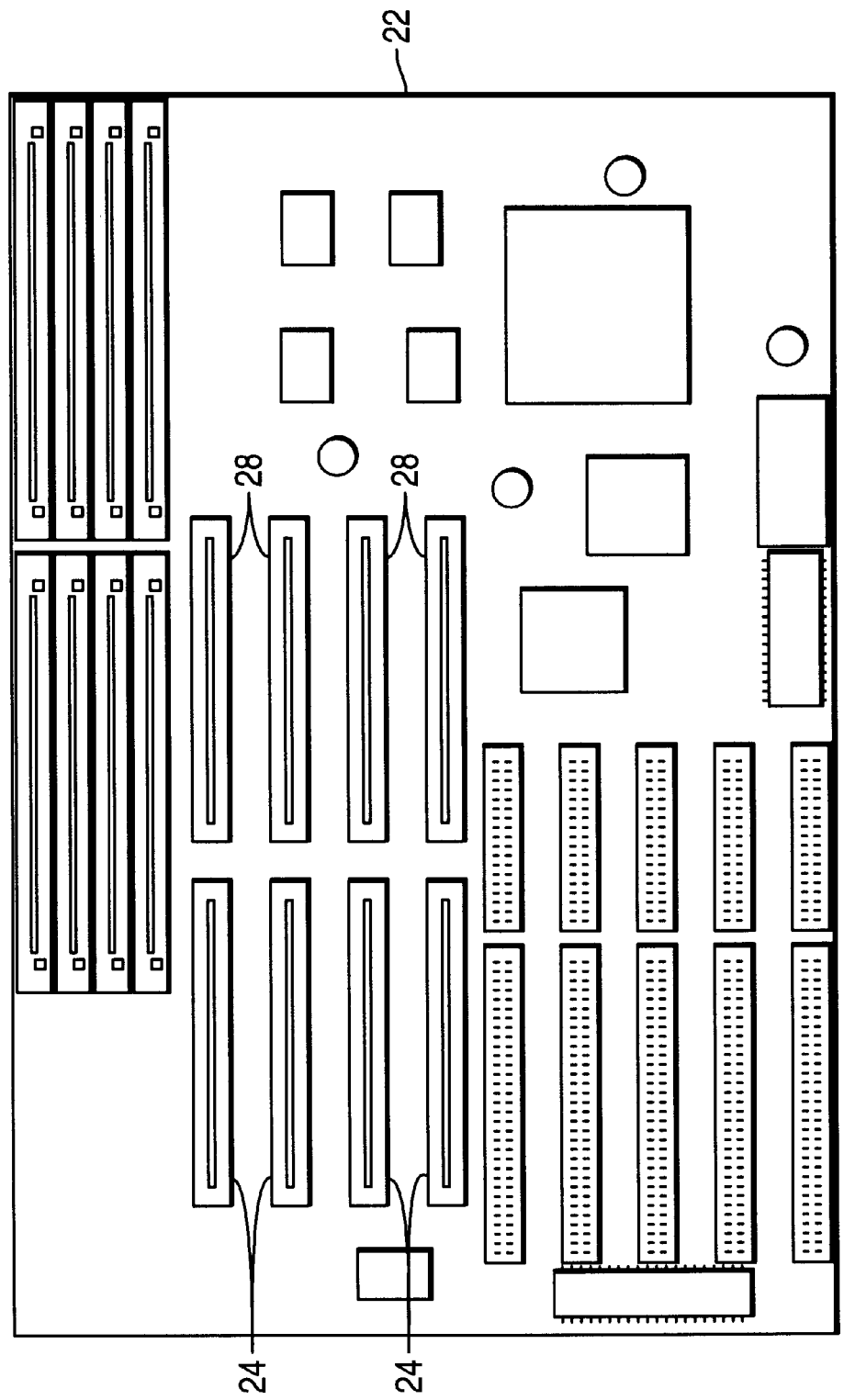
FIG. 2 is a plan view of a communications-oriented computer system backplane including a time-domain multiplexed signal bus (TDMSB) and additional expansion slot modules connected thereto for the transmission of time-dependent high-speed digitized signal information according to the invention.
Figure 3:
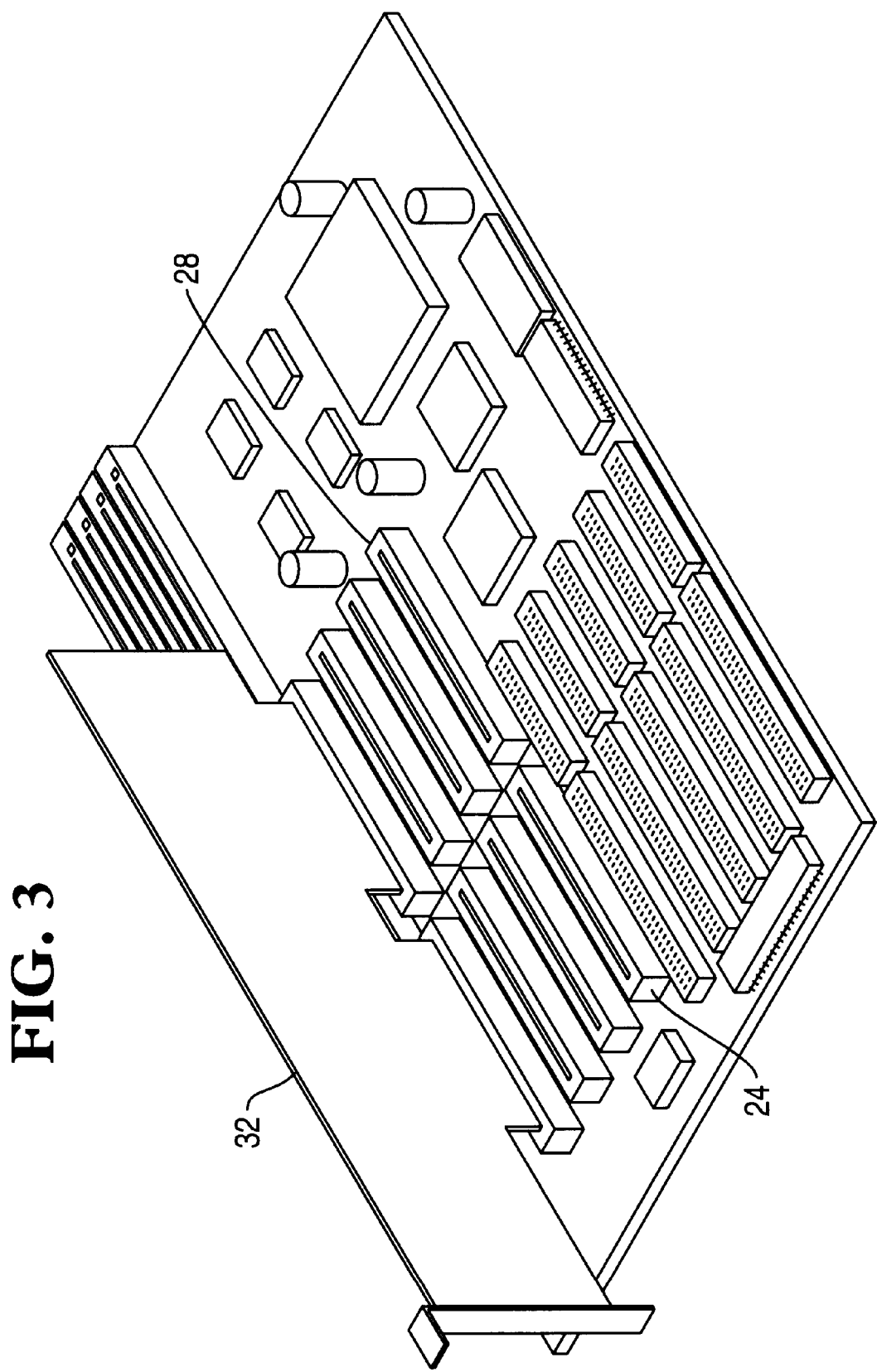
FIG. 3 is a perspective view of the backplane of FIG. 2 further illustrating a special printed circuit board card 32 for interconnecting the PCI I/O and TDMSB busses for the simultaneous exchange of data.

There is shown in FIG. 2 a computer system backplane 22 for offering network services and including a first group of four expansion slot modules 24 providing connection to a PCI input/output bus embedded within backplane 22 for handling address, data, and control information required by the memory and input/output controllers of the computer system.

The communications-oriented computer system backplane 22 also includes a second group of expansion slot modules 28 providing connection to a time-domain multiplexed signal bus (TDMSB) also embedded within backplane 22 for handling digitized voice, video, facsimile or voice-band encoded data. Each expansion slot module 24 connected to the PCI I/O bus is aligned with a corresponding expansion slot module 28 connected to the TDMSB bus, permitting interconnect of the input/output bus with the time-domain multiplexed signal bus for transmitting data therebetween. The time-domain multiplexed signal bus and associated expansion slot modules thus enable transfer of real-time signal information while simultaneously exchanging data, which may or may not be related, over the standard input/output bus.

The provision of the time-domain multiplexed signal bus and associated expansion slot modules increases the versatility of the computer system. For example, a special printed circuit board card 32 can be provided to interconnect the PCI I/O and TDMSB busses through corresponding expansion slot modules 24 and 28 for the simultaneous exchange of data. That is, card 32 can pass data up to the operating system after it has been decoded by an analog interface, such as a V.34 modem (not shown), pulling audio signals from the time-domain multiplexed signal bus.

Another benefit afforded by the communications-oriented computer system backplane of the present invention is that higher-speed data may be placed on a defined time-domain multiplexed signal bus than would be possible via cabling, with greater reliability than is afforded by current cable-based solutions available for personal computer systems. Examples of the above include board-level hot pluggability (a high-reliability feature pertaining to the support for board insertion/removal into/from a "live" or powered system) and board-level power management. These arc features beginning to appear in other board-level busses such as PCI and PCMCIA. Moreover, adapter vendors may design cards without additional expensive connectors since only edge connectors are required, and cable space in the computer cabinet will no longer be required.

While in accordance with the provisions of the patent statute the preferred forms and embodiments have been illustrated and described, it will be apparent to those of ordinary skill in the art that various changes and modifications may be made without deviating from the inventive concepts set forth above.

What is claimed is:

1. A communications-oriented computer system backplane, comprising:
    a first expansion bus for transmission of address, data, and control information, said first expansion bus comprising a PCI input/output bus and at least one expansion slot module connected to said PCI I/O bus for the connection of an I/O logic card; and
    a second expansion bus for transmission of high-speed digitized signal information, said second expansion bus comprising a time-domain multiplexed signal bus (TDMSB) and at least one expansion slot module connected to said time-domain multiplexed signal bus for the connection of a high-speed digitized signal logic card.

2. Apparatus as defined in claim 1, wherein said expansion slot module connected to said input/output bus is in alignment with said expansion slot module connected to said time-domain multiplexed signal bus.

3. Apparatus as defined in claim 2, and further comprising means for interconnecting said input/output bus with said time-domain multiplexed signal bus for transmitting data therebetween.

4. A communications-oriented computer system backplane, comprising:
    a PCI input/output bus for transmission of address, data, and control information, said PCI input/output bus including a plurality of expansion slot modules connected to said PCI input/output bus for the connection of I/O logic cards; and
    a time-domain multiplexed signal bus (TDMSB) for transmission of high-speed digitized signal information, said time-domain multiplexed signal bus including a plurality of expansion slot modules connected to said time-domain multiplexed signal bus for the connection of high-speed digitized signal logic cards; and
    wherein each one of said plurality of expansion slot modules connected to said input/output bus is in alignment with a corresponding one of said plurality of expansion slot modules connected to said time-domain multiplexed signal bus.

5. Apparatus as defined in claim 4, further comprising means for interconnecting said input/output bus with said time-domain multiplexed signal bus for transmitting data therebetween.

* * * * *